United States Patent [19]

Kugiya et al.

[11] Patent Number: 5,093,822
[45] Date of Patent: Mar. 3, 1992

[54] HIGH-DENSITY MAGNETIC RECORDING AND OPTICAL REPRODUCING APPARATUS

[75] Inventors: Fumio Kugiya, Hachioji; Mikio Suzuki, Kokubunji; Kyo Akagi, Fuchu; Takeshi Nakao, Sagamihara; Masaaki Futamoto, Kanagawa; Yoshinori Miyamura, Tokyo; Hisashi Takano, Hachioji; Yoshibumi Matsuda, Kokubunji, all of Japan

[73] Assignee: Hitachi, Ltd., Tokyo, Japan

[21] Appl. No.: 532,686

[22] Filed: Jun. 4, 1990

[30] Foreign Application Priority Data

Jun. 7, 1989 [JP] Japan .................. 1-142945

[51] Int. Cl.⁵ .............................................. G11B 7/00
[52] U.S. Cl. ................................... 369/121; 369/100;
369/109; 369/116; 369/13; 360/59
[58] Field of Search ............... 369/121, 122, 44.34,
369/44.38, 44.39, 44.41, 44.42, 100, 13, 110,
109, 111, 116, 146; 360/135, 114, 59

[56] References Cited

U.S. PATENT DOCUMENTS 4,544,443 10/1985 Ohta et al. ........................ 369/13
4,853,912 8/1989 Akasaka et al. .................. 369/100
4,871,614 10/1989 Kobayashi ........................ 369/13

FOREIGN PATENT DOCUMENTS 55-84909 6/1980 Japan .................. 369/121
52-127242 7/1984 Japan .................. 369/121
63-55737 3/1988 Japan .................. 369/121

Primary Examiner—Roy N. Envall, Jr.
Assistant Examiner—Thai Tran
Attorney, Agent, or Firm—Antonelli, Terry, Stout & Kraus

[57] ABSTRACT

A high-density magnetic recording and optical reproducing apparatus for magneto-optically reproducing information magnetically recorded on information tracks on a recording medium, the apparatus comprising two laser beam sources emitting laser beams having different wavelengths respectively, an optical system for directing the laser beams from the two laser beam sources toward and onto the recording medium so as to irradiate the recording medium with laser beam spots partly overlapping each other, two photo detectors detecting the laser beams reflected from the surface of the recording medium, and a differential amplifier detecting the difference between the output signals of the two photo detectors thereby generating the differential signal as a reproduced output.

16 Claims, 4 Drawing Sheets

HIGH-DENSITY MAGNETIC RECORDING AND OPTICAL REPRODUCING APPARATUS

BACKGROUND OF THE INVENTION

This invention relates to a magnetic recording and optical reproducing apparatus in which a magneto-optical effect is utilized so as to reproduce information magnetically recorded on a recording medium by applying a recording magnetic field from a magnetic head.

It has been confirmed that an information bit length as short as 0.1 μm in terms of a linear bit density can be recorded on a recording medium according to a recording method in which a recording magnetic field generated from a magnetic head is used to magnetically record information on the recording medium, as described in, for example, IEEE TRANSACTIONS ON MAGNETICS, VOL. MAG-23, No. 5, SEPTEMBER 1987, page 2070."

On the other hand, a method utilizing a magneto-optical effect for the high-sensitivity reproduction of information magnetically recorded on a recording medium is described in, for example, JP-A-55-153142.

SUMMARY OF THE INVENTION

In the case of the disclosure of JP-A-55-153142 cited above, the density of records that can be reproduced is limited by the spot diameter of a laser beam emitted from a laser beam source irradiating the recording medium. This beam spot diameter is determined by the wavelength of the laser beam emitted from the laser beam source and is commonly 0.8 μm at present. On the other hand, in the case of the method of magnetic information recording described in "IEEE TRANSACTIONS ON MAGNETICS" cited above, information can be recorded with the linear bit density of 0.1 μm. Thus, in order that the information magnetically recorded with the linear bit density of 0.1 μm can be reproduced by magneto-optical means, it is necessary to develop a laser beam source capable of emitting a laser beam having a wavelength which is as short as about 1/10 of that commonly used at present. It is expected that considerable difficulty will be encountered for the development of such a laser beam source.

It is an object of the present invention to provide a high-density magnetic recording and optical reproducing apparatus which can reproduce magnetically recorded information having a bit length shorter than the diameter of a laser beam spot.

The present invention which attains the above object has features as described presently.

1. An embodiment of the high-density magnetic recording and optical reproducing apparatus for magneto-optically reproducing information magnetically recorded on information tracks on a recording medium comprises two kinds of laser beam sources emitting laser beams having different wavelengths respectively, beam directing means for directing the laser beams from the two laser beam sources toward and onto the recording medium so as to irradiate the recording medium with laser beam spots partly overlapping each other, two detecting means for detecting the laser beams reflected from the surface of the recording medium respectively, and differential means for detecting the difference between the output signals of the two detecting means thereby generating the differential signal as a reproduced output.

FIG. 1 corresponds to this feature of the present invention.

2. In the magnetic recording and optical reproducing apparatus according to the feature 1, the two beam spots partly overlapping each other are elliptical in shape, the major or minor axis of each of the two elliptical beam spots registering with the direction of the information track, and the beam spot of the laser beam emitted from one of the laser beam sources and having a shorter wavelength is enclosed in the beam spot of the laser beam emitted from the other laser beam source and having a longer wavelength, the former beam spot being in contact at one end located on the information track with the corresponding end of the latter beam spot.

FIG. 2 corresponds to this feature of the present invention.

3. In the magnetic recording and optical reproducing apparatus according to the feature 2, the minor axes of the two beam spots have the same value in the widthwise or transverse direction of the information track.

FIG. 3 corresponds to this feature of the present invention.

4. In the magnetic recording and optical reproducing apparatus according to the features 1 to 3, the recording medium includes a recording layer of a material having perpendicular anisotropy.

This feature is shown in, for example, FIG. 1.

5. In the magnetic recording and optical reproducing apparatus according to the features 1 to 4, the recording medium includes a soft magnetic underlayer disposed beneath the recording layer showing the perpendicular anisotropy.

FIG. 5 corresponds to this feature of the present invention.

6. In the magnetic recording and optical reproducing apparatus according to the features 1 to 5, the recording medium includes, on the recording layer, a magnetic transfer layer exhibiting a great magneto-optical effect.

FIG. 6 corresponds to this feature of the present invention.

7. In the magnetic recording and optical reproducing apparatus according to the features 1 to 6, the adjacent information tracks on the recording medium are magnetically isolated from each other by a nonmagnetic layer or a trench.

FIG. 7 corresponds to this feature of the present invention.

8. In accordance with another aspect of the present invention, there is provided a high-density magnetic recording and optical reproducing method for reproducing information magnetically recorded on information tracks on a recording medium, the method comprising the steps of directing laser beams having respectively different wavelengths from two laser beam sources toward and onto the recording medium in a relation partly overlapping each other, detecting by two detecting means the individual laser beams reflected from the surface of the recording medium according to their wavelengths, respectively, and, generating, as a reproduced output from differential means, a differential signal representing the difference between the output signals of the detecting means.

FIG. 1 corresponds to this feature of the present invention.

When a laser beam emitted from a laser beam source is subjected to polarization, and this polarized laser beam is directed toward and onto a region of a recording medium where information is magnetically recorded in the form of magnetization information, the plane of polarization of the laser beam reflected from the surface of the recording medium is rotated by a magneto-optical effect in a relation corresponding to the direction and magnitude of the magnetization.

In this case, when two kinds of laser beam sources emitting laser beams having respectively different wavelengths $\lambda_1$ and $\lambda_2$ are employed, and such laser beams are directed to irradiate the recording medium through the same optical system, two beam spots formed on the surface of the recording medium have different diameters which are dependent upon the wavelengths of the laser beams, so that these two beam spots can be made to partly overlap each other as shown in FIG. 2. In FIG. 2, there is the relation $\lambda_1 > \lambda_2$ between the wavelengths $\lambda_1$ and $\lambda_2$ of the laser beams. Then, when the information magnetically recorded on the recording medium is detected by detecting the rotation of the plane of polarization of each of the laser beams reflected from the surface of the recording medium, and the difference between the detected signals is generated as a reproduced output signal, the information recorded on the region (the hatched region shown in FIG. 2) where the two beam spots do not overlap each other is emphasized and detected.

That is, according to the features 1 to 8 described above, information recorded with a recording wavelength shorter than a recording wavelength which permits reproduction of information by a single laser beam source can be reproduced. Therefore, information can be reproduced with a higher resolution.

Further, according to the features 2 and 3 described above the beam spots are elliptical in shape. In this case, the area of an unnecessary portion (a portion which has not any direct concern with required bit information) in the zone where the two elliptical beam spots do not overlap each other can be easily effectively minimized when the values of the major axes of the elliptical beam spots in the direction of the track are suitably adjusted or when the values of the minor axes of the elliptical beam spots in the transverse direction of the track are selected to be equal to each other. Therefore, the S/N ratio can be easily improved.

Also, in the case of the recording layer showing the perpendicular anisotropy described in the features 4 to 6, a demagnetizing field produced as a result of generation of magnetic poles on the upper and lower surfaces respectively of the perpendicularly magnetized recording layer may act to weaken the magnitude of perpendicular magnetization. In this case, the softmagnetic underlayer disposed beneath the recording layer acts to lessen the possibility of generation of the magnetic poles, thereby reducing the strength of the demagnetizing field. Therefore, the amount of perpendicular residual magnetization is increased to improve the reproduced output thereby improving the S/N ratio.

Also, the disposition of the magnetic transfer layer exhibiting the great magneto-optical effect on the recording layer is effective when, for example, the material of the recording layer is quite useful for high-density information recording but is insufficient in the Kerr effect. Therefore, when the magnetization information on the recording layer is transferred to the softmagnetic transfer layer, the peculiar property of the magnetic transfer layer can be utilized in regard to the Kerr effect, and the S/N ratio can be effectively improved.

Also, when the recording medium described in the features 7 is used, and the laser beam spots having their minor axes larger than the width of each of the tracks are directed, the unnecessary portion which does not contribute to the signal reproduction and which lies in the zone where the two beam spots do not overlap each other, can be easily excluded from contribution to the signal reproduction, so that the S/N ratio can be greatly effectively improved.

DESCRIPTION OF THE PREFERRED EMBODIMENTS

An embodiment of the high-density magnetic recording and optical reproducing apparatus according to the present invention will now be described in detail with reference to FIG. 1.

Figure 1:
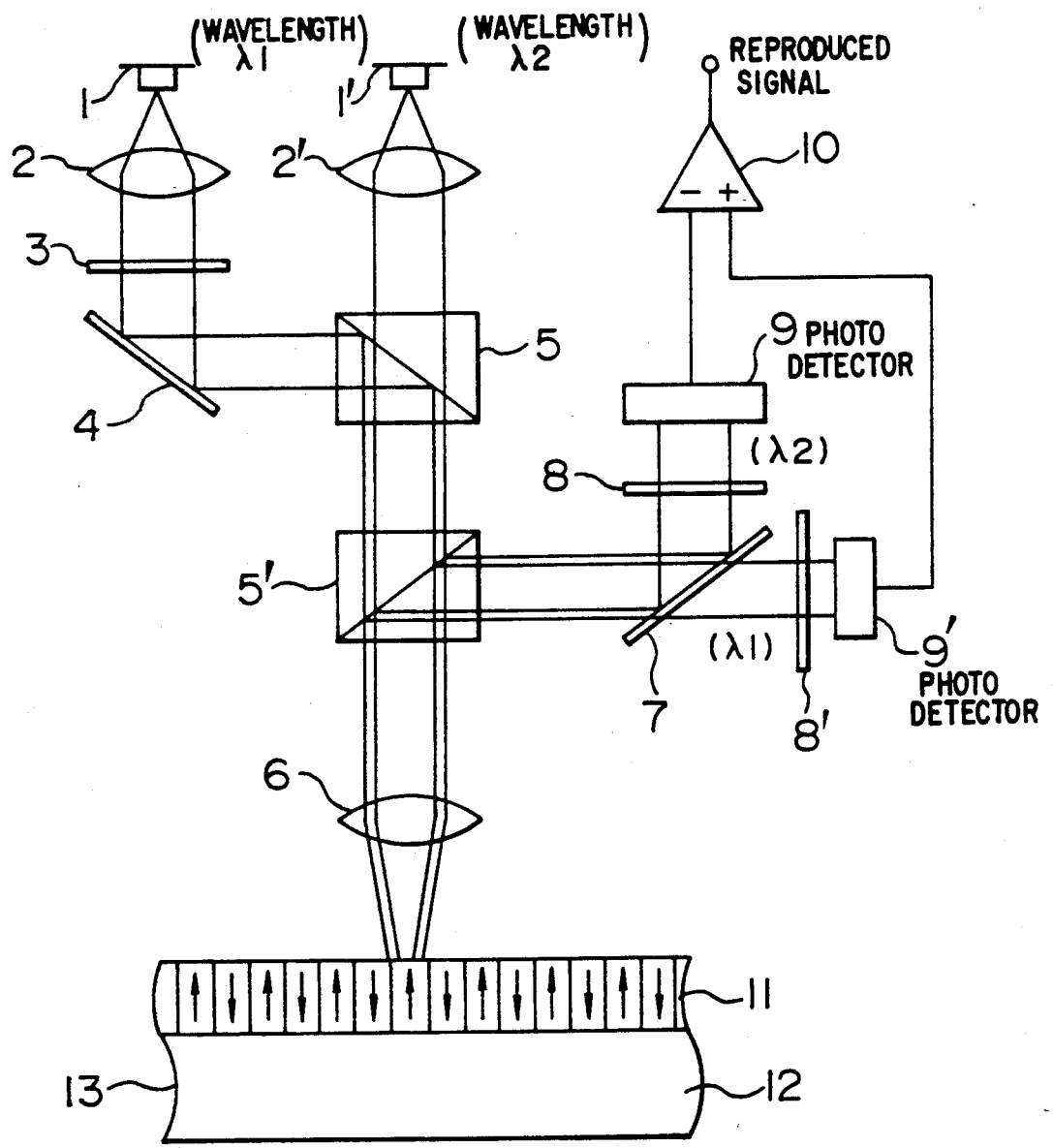
FIG. 1 is a diagrammatic view showing the structure of an information reproducing system in an embodiment of the high-density magnetic recording and optical reproducing apparatus according to the present invention.

Referring to FIG. 1, two kinds of semiconductor lasers 1 and 1' emit laser beams having different wavelengths $\lambda_1$ and $\lambda_2$ respectively. The laser beam having the wavelength $\lambda_1$ emitted from the first semiconductor laser 1 passes through a collimating lens 2 and a polarizer 3 to be turned into a parallel beam having a predetermined plane of polarization only. The laser beam is then reflected by a half mirror 4, and the reflected beam is then combined in a beam splitter 5 with the laser beam having the wavelength $\lambda_2$ emitted from the second semiconductor laser 1'. After the combined beams pass through a second beam splitter 5', the beams are focused by an objective lens 6 on the surface of a recording layer 11 formed on a base 12 of a recording medium 13. The beams reflected from the surface of the recording layer 11 are reflected by the beam splitter 5'. The reflected beams from the beam splitter 5' are incident on a dichroic mirror 7 where the combined beams are separated into the individual beam components according to the wavelengths, and these beam components are guided through polarizers 8 and 8' to photo detectors 9 and 9' respectively. In the photo detectors 9 and 9', the Kerr effect of the surface of the recording layer 11 causing rotation of the plane of polarization of the beams depending on both the direction of magnetization and the relative magnitudes of magnetization of the recording layer 11 is utilized to detect the quantities of the beams incident on the respective photo detectors 9 and 9', so that the magnetization information can be derived from a differential amplifier 10 connected to the photo detectors 9 and 9'.

Figure 2:
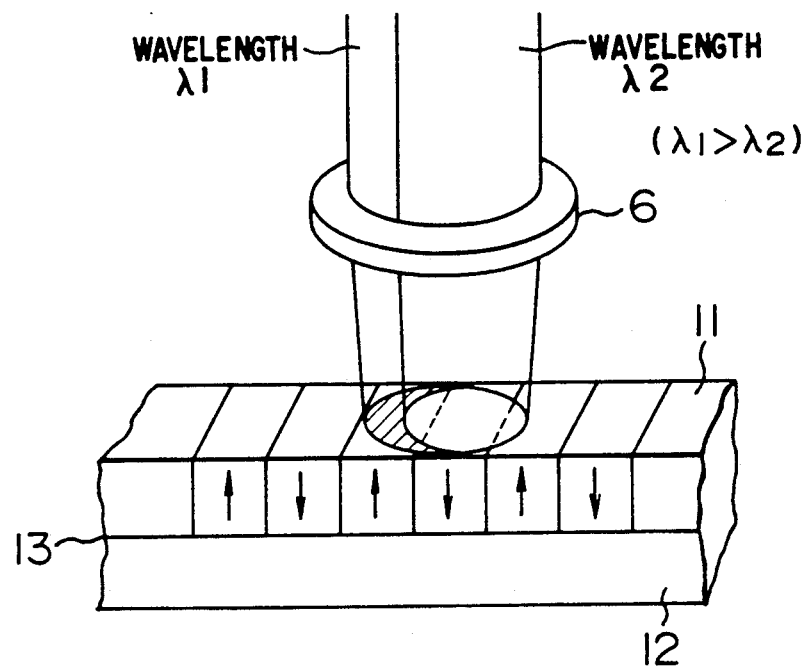
FIG. 2 shows in detail the recording medium and the associated objective lens shown in FIG. 1.

Because the laser beams directed toward and onto the surface of the recording layer 11 of the recording medium 13 pass through the same objective lens 6, the diameters of the laser beam spots are dependent upon their wavelengths. Therefore, when the centers of the two beam spots are displaced relative to each other as shown in FIG. 2, and the difference between the output signals of the photo detectors 9 and 9' is derived as a reproduced output from the differential amplifier 10, the magnetization information in the hatched region shown in FIG. 2 is emphasized, and such an output signal can be generated from the differential amplifier 10. The relative displacement of the centers of the two beam spots can be achieved by suitably adjusting the inclination angle of the half mirror 4 in FIG. 1 thereby adjusting the angle of incidence, on the first beam splitter 5, of the laser beam having the wavelength $\lambda_1$. A half mirror with taper flat is preferably used as the half mirror 4 shown in FIG. 1. The use of such a half mirror is effective in that the angle of incidence of the laser beam having the wavelength $\lambda_1$ on the beam splitter 5 can be more accurately adjusted when the taper angle of the half mirror 4 is utilized to adjust the relative displacement of the centers of the two beam spots.

Figure 3:
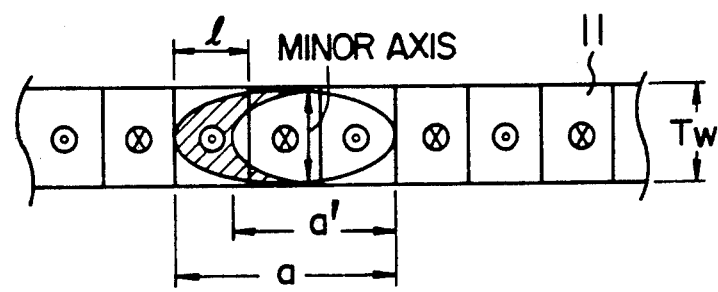
FIG. 3 shows the positional relation between the laser beam spots and the track on the recording medium shown in FIG. 1.

The positional relation between the two laser beam spots and the track on the recording medium 13 will now be described with reference to FIG. 3. FIG. 3 shows that the two beam spots irradiate the recording medium 13 on which information is recorded with a bit length l and a track width Tw and in which its recording layer 11 shows magnetic anisotropy. In the illustrated embodiment, the two beam spots are elliptical in shape, and the relative positions of these two beam spots are adjusted, so that the major axis of each elliptical beam spot is registered with the scanning direction, and one of the two beam spots contacts at one end with the corresponding end of the other beam spot in the direction of the track. When the two beam spots have an elliptical shape as described above, and the values of the major axes of the elliptical beam spots are suitably selected, or when the minor axes of these two elliptical beam spots have the same value in the transverse direction of the track, the area of the arrowhead-like portion of the zone (the hatched zone shown in FIG. 3) where the two beam spots do not overlap each other can be made considerably small. Because a semiconductor laser primarily emits a laser beam forming an elliptical beam spot, such a beam spot can be directly used. The sizes of the two beam spots are determined by the wavelengths of the laser beams respectively, and the ellipticities of the two beam spots can be adjusted by controlling the astigmatic differences of the two laser beams respectively. As an effective means for attaining the above purpose, a lens, for example, a cylindrical lens may be used in place of the objective lens 6. In the illustrated embodiment, the elliptical beam spots have their major axes of ellipses registered with the direction of the track. However, when the recording track width Tw is considerably large as compared to the bit length l, the minor axes of the elliptical beam spots may be selected to register with the direction of the track.

Figure 4:
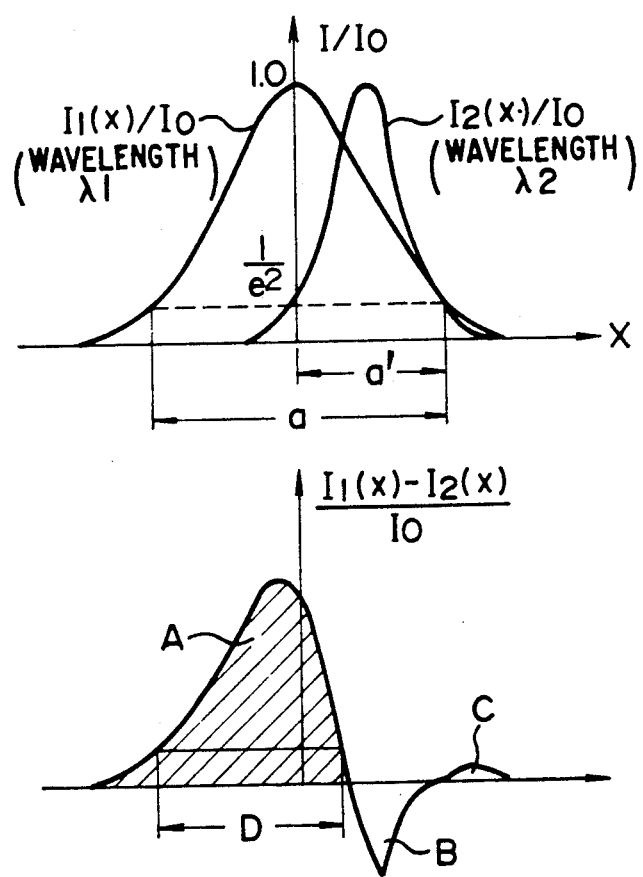
FIG. 4 illustrates the relation between a reproduced signal and the intensity distribution of the two beam spots in the direction of the track in FIG. 1.

The principle for achieving the desired information reproduction with a satisfactorily good S/N ratio according to the present invention will be described in detail with reference to FIG. 4. FIG. 4 shows the beam intensity distribution along the track direction x when the major axes of the two beam spots have their values a and a' respectively, and the maximum values of the intensities of these two beams are the same. FIG. 4 also shows the results of calculation of the beam intensity distribution when the beam intensity of the beam spot having the major axis value a' is subtracted from that of the beam spot having the major axis value a.

The beam intensity distribution $I_1(x)$ of the spot of the laser beam having the wavelength $\lambda_1$ and that $I_2(x)$ of the spot of the laser beam having the wavelength $\lambda_2$ are expressed as follows:

$$I_1(x) = I_0 \exp\left(-\frac{8x^2}{a^2}\right)$$

$$I_2(x) = I_0 \exp\left(-\frac{8x^2}{a'^2}\right)$$

For the purpose of improving the S/N ratio according to the present invention, it is important that the width D of the beam intensity distribution in a hatched region A (the width of the beam intensity distribution where the beam intensity is given by $1/e^2$ of the maximum value) be adjusted to be smaller than the bit length l and that the total sum of the areas of regions B and C is sufficiently small as compared to the area of the region A. The above requirements are met by suitably selecting the two beam wavelengths $\lambda_1$ and $\lambda_2$ determining the major diameters of the respective beam spots and by suitably adjusting the maximum values of the intensities of the two laser beams. In the illustrated embodiment, the value b of the minor axis of each of the beam spots is selected to be equal to the recording track width Tw as shown in FIG. 3. However, when the accuracy of positioning the beam spots with respect to the transverse direction of the track is taken into account, it is advantageous from the aspect of the S/N ratio that the optimum value b of the minor axis of each of the beam spots is to be selected to be slightly smaller than the recording track width Tw.

According to the results of an experiment in which the laser beam wavelengths $\lambda_1 = 830$ nm and $\lambda_2 = 650$ nm were used, it was confirmed that the length of the non-overlapping zone of the two beam spots was shortened to 0.25 μm which is about ¼ of the value of the major axis of the beam spot of the laser beam having the wavelength $\lambda_2$. Therefore, an information bit length which is only about ¼ of the bit length which could be reproduced hitherto can now be reproduced according to the present invention.

Figure 5:
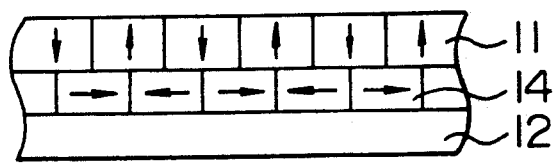
FIG. 5 is a schematic sectional view of another form of the recording medium in which a softmagnetic underlayer is disposed beneath the perpendicular recording layer.

The recording medium 13 used in the illustrated embodiment of the present invention includes the base 12 of Al or like material having an Ni-P non-magnetic plated layer thereon, and the recording layer 11 of a material having perpendicular anisotropy is formed on the base 12. More precisely, the perpendicular recording layer 11 of Co-Cr having a saturation magnetic flux density of 0.5T and a thickness of 200 nm is formed on the base 12, and an information signal is detected according to the polar Kerr effect. However, a material such as a Co-Ni-P compound having longitudinal anisotropy may be used in place of the Co-Cr alloy, and an information signal may be detected according to the longitudinal Kerr effect. Further, a soft magnetic underlayer 14 is preferably disposed beneath the perpendicular recording layer 11 as shown in FIG. 5 so as to lessen a demagnetizing field produced as a result of magnetization of the perpendicular recording layer 11. The provision of this soft magnetic underlayer 14 is effective to increase the residual magnetization thereby improving the reproduced output.

Figure 6:
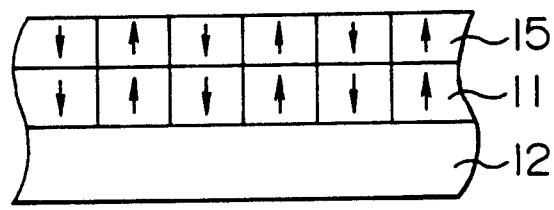
FIG. 6 is a schematic sectional view of still another form of the recording medium in which a magnetic transfer layer is disposed on the perpendicular recording layer.

FIG. 6 shows another form of the recording medium 13. Referring to FIG. 6, a magnetic transfer layer 15 of a material showing a large Kerr rotation angle is disposed on the perpendicular recording layer 11. In the form shown in FIG. 6, the magnetic transfer layer 15 of a soft magnetic material showing perpendicular anisotropy is used because the recording layer 11 is of the perpendicular recording type. However, when the recording layer 11 is of the longitudinal recording type, the magnetic transfer layer 15 is preferably formed of a soft magnetic material showing longitudinal anisotropy. Also, not shown in FIG. 6, a soft magnetic underlayer may be disposed beneath the recording layer 11 to on which the magnetic transfer layer 15 is disposed.

Figure 7:
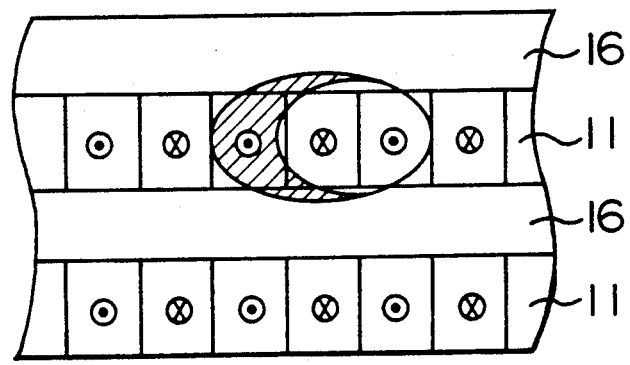
FIG. 7 shows the relation between the beam spots and yet another form of the recording medium which is a so-called discrete track media.

FIG. 7 shows still another form of the recording medium 13. This recording medium 13 is of the so-called discrete track media type in which the adjacent recording tracks are magnetically isolated from each other by a non-magnetic layer or a trench 16. When the recording medium 13 shown in FIG. 7 is irradiated with laser beam spots whose minor axes in the transverse direction of the track are larger than the recording track width, the non-magnetic layer or trench part 16 of hatched arrow head-like zone where the two beam spots do not overlap each other does not contribute to the reproduction of information, so that the S/N ratio can be greatly improved.

According to the present invention, an information bit length as short as about ¼ of the bit length which could only be reproduced by the use of a single semiconductor laser can be successfully and reliably reproduced. That is, according to the present invention, information can be reproduced with a resolution much higher than that of information reproduction by the use of a single semiconductor laser. Thus, the present invention can provide a high linear-bit-density, magnetic recording and optical reproducing apparatus.

What is claimed is:

1. A high-density magnetic recording and optical reproducing apparatus for magneto-optically reproducing information magnetically recorded on information tracks on a recording medium, said apparatus comprising two laser beam sources emitting laser beams having different wavelengths respectively, beam directing means for directing the laser beams from said two laser beam sources toward and onto said recording medium so as to irradiate said recording medium with two laser beam spots partly overlapping each other, two detecting means for detecting the laser beams reflected from the surface of said recording medium, and differential means for detecting the difference between the output signals of said two detecting means thereby generating the differential signal as a reproduced output, wherein the two beam spots partly overlapping each other are elliptical in shape, a major or minor axis of each of the two elliptical beam spots registering with a direction of an information track, and the beam spot of the laser beam emitted from one of said laser beam sources and having a shorter wavelength is enclosed in the beam spot of the laser beam emitted from the other laser beam source and having a longer wavelength, the former beam spot being in contact at one end located on the information track with the corresponding end of the latter beam spot.

2. A high-density magnetic recording and optical reproducing apparatus according to claim 1, wherein the minor axes of said laser beam spots partly overlapping each other have the same value in the transverse direction of the information track.

3. A high-density magnetic recording and optical reproducing apparatus according to claim 1, wherein said recording medium includes a recording layer of a material having perpendicular anisotropy.

4. A high-density magnetic recording and optical reproducing apparatus according to claim 1, wherein said recording medium includes a soft magnetic underlayer disposed beneath said recording layer showing the perpendicular anisotropy.

5. A high-density magnetic recording and optical reproducing apparatus according to claim 1, wherein said recording medium includes, on said recording layer, a magnetic transfer layer exhibiting a great magneto-optical effect.

6. A high-density magnetic recording and optical reproducing apparatus according to claim 1, wherein the adjacent information tracks on said recording medium are magnetically isolated from each other by a nonmagnetic layer or a trench.

7. A high-density magnetic recording and optical reproducing method for reproducing information magnetically recorded on information tracks on a recording medium, said method comprising the steps of directing two laser beams having respectively different wavelengths from two laser beam sources toward and onto said recording medium in a relation partly overlapping each other so that a portion of said recording medium which is irradiated by one of the two laser beams without being overlapped by the other of the two laser beams corresponds substantially to one domain region on said recording medium on which information is recorded, detecting by two detecting means the individual laser beams reflected from the surface of said recording medium according to their wavelengths respectively, and generating, as a reproduced output from differential means, the differential signal representing the difference between the output signals of said detecting means which is indicative of the information of the one domain region.

8. A high-density magnetic recording and optical reproducing method according to claim 7, wherein the laser beams emitted from said laser beam sources form elliptical beam spots partly overlapping each other on the surface of said recording medium, a major or minor axis of each of the elliptical beam spots registering with direction of information track, and the beam spot of the laser beam emitted from one of said laser beam sources and having a shorter wavelength is enclosed in the beam spot of the laser beam emitted from the other laser beam source and having a longer wavelength, the former beam spot being in contact at one end located on the information track with the corresponding end of the latter beam spot.

9. A high-density magnetic recording and optical reproducing method according to claim 8, wherein the minor axes of said laser beam spots partly overlapping each other have the same value in the transverse direction of the information track.

10. A high-density magnetic recording and optical reproducing method according to claim 7, wherein said recording medium includes a recording layer of a material having perpendicular anisotropy.

11. A high-density magnetic recording and optical reproducing method according to claim 7, wherein said recording medium includes a soft magnetic underlayer disposed beneath said recording layer showing the perpendicular anisotropy.

12. A high-density magnetic recording and optical reproducing method according to claim 7, wherein said recording medium includes, on said recording layer, a magnetic transfer layer exhibiting a great magneto-optical effect.

13. A high-density magnetic recording and optical reproducing method according to claim 7, wherein the adjacent information tracks on said recording medium are magnetically isolated from each other by a nonmagnetic layer or a trench.

14. A high-density magnetic recording and optical reproducing method according to claim 7, wherein said laser beams having the respectively different wavelengths are directed toward and onto said recording medium through the same optical system.

15. A high-density magnetic recording and optical reproducing apparatus according to claim 1, wherein each of the two beam spots has a the major axis thereof extending in the direction of the information track.

16. A high-density magnetic recording and optical reproducing method according to claim 7, wherein each of the two beam spots has the major axis thereof extending in the direction of the information track.

* * * * *